O. METZE.
SIDE CAR FOR BICYCLES OR MOTOR CYCLES.
APPLICATION FILED JUNE 13, 1914. RENEWED MAR. 21, 1916.

1,185,120.

Patented May 30, 1916.
2 SHEETS—SHEET 1.

Witnesses

Inventor
Oscar Metze

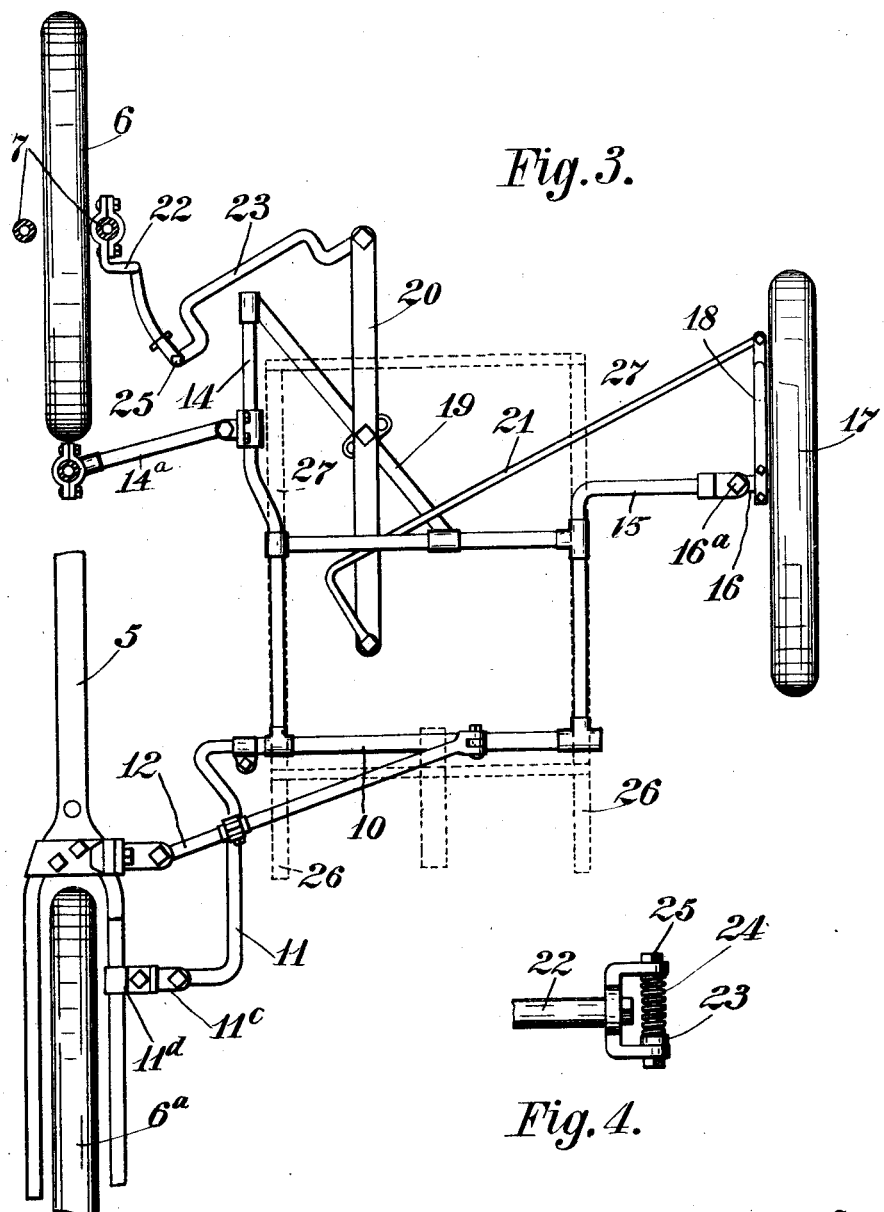

UNITED STATES PATENT OFFICE.

OSCAR MEYER, OF COLUMBUS, OHIO.

SIDE CAR FOR BICYCLES OR MOTOR-CYCLES.

1,185,120.  Specification of Letters Patent.  Patented May 30, 1916.

Application filed June 15, 1914, Serial No. 884,975.

*To all whom it may concern:*

Be it known that I, OSCAR MEYER, a citizen of the United States, residing at Columbus, in the county of Franklin and State of Ohio, have invented a certain new and useful Improvement in Side Cars for Bicycles or Motor-Cycles, of which the following is a specification.

The object of this invention is to provide improved means for attaching a side car to a bicycle or motor-cycle, whereby, among other advantages, first, the side car can be located farther forward than heretofore has been the practice, second, whereby flexibility between the side car chassis and the bicycle or motor-cycle is secured and the side car cushioned, and third improved means for steering the side car supporting wheel.

The invention is embodied in the construction herein particularly shown and described, the features of novelty being pointed out in the claims.

Figure 1:
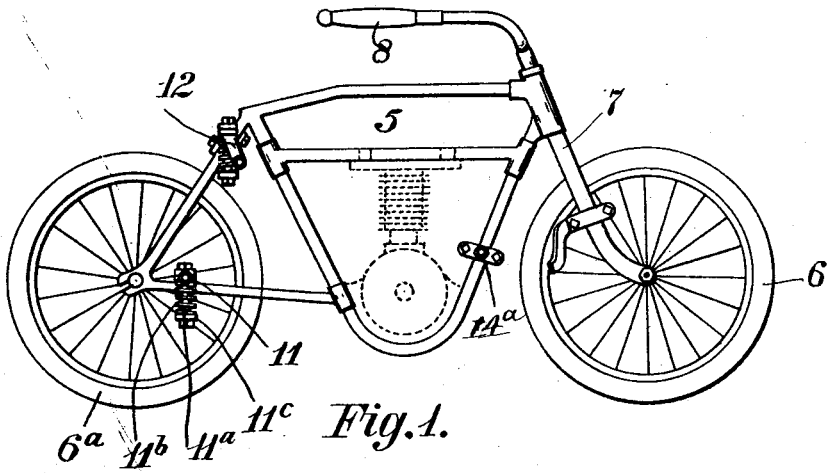
Figure 2:
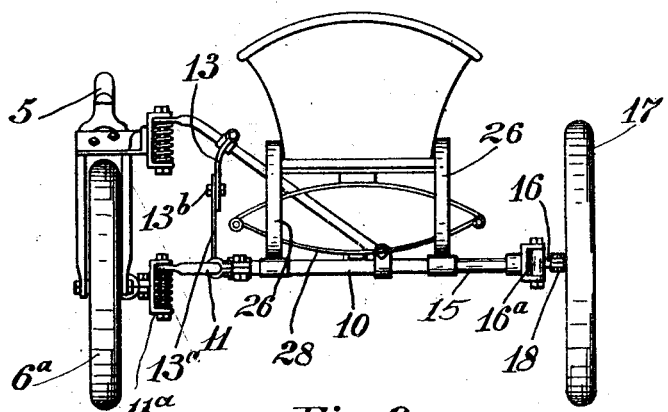

In the accompanying drawings—Figure 1 is a side elevation of the main driving member with some details in section. Fig. 2 is a rear view showing the side car attached. Fig. 3 is a plan view to illustrate the details of the side car chassis, including the side wheel steering means. Fig. 4 is a detail illustrating the connection between the steering arm of the front fork of the main driving structure and the operating means for steering the side car wheel.

In the views 5 designates the frame of an ordinary bicycle or motor-cycle, said frame having the usual rear wheel 6 and forward wheel 6, the latter being supported in the usual swiveled fork 7 having the usual handles, one of which is shown at 8 for controlling the position of the fork 7 and wheel 6.

The side car chassis comprises a rigid frame 10 having a rigid rearward extension 11 supported by a coil spring 11ᵃ on a pin 11ᵇ in a frame 11ᶜ held in a clamping member 11ᵈ embracing and bolted to the lower right hand bar of the rear fork of the main frame of the bicycle or motor-cycle. The rear portion of the frame 10 has secured to it a stay rod 12 that is secured to the upper portion of the rear fork of the main frame 5 in substantially the same manner as is the extension 11 and need not be more particularly described. The side car 13 is secured in fixed relation to the main bar 10 by means of rods 12 and 13ᵃ and is braced together on a bolt at 13ᵇ so that said bar and the rearward extension 11 move in unison or at least the springs supporting them yield and relax together. The frame 10 has a forward extension 14 that is connected to the forward portion of the main frame intermediate the flexibility means of bar 14ᵇ. Where the motor-cycle is equipped with spring fork the connection of bar 14ᵇ can be spring-less; otherwise the connection at the frame can be as changing that hereinbefore described. Further connection between the frame 10 and the frame of the bicycle or motor-cycle can be supplemented by further bars if desired. The frame 10 has a lateral extension 15 at the forward outer corner and to the end of this extension is articulated at 15ᵃ a stud axle upon which the side wheel 17 is journaled. The bracket 15ᵃ is arranged as shown to permit the wheel 17 to turn on a vertical axis, and to the axle 17 is rigidly attached a forwardly extending arm 18.

Connecting the forward extremity of the extension 14 and the forward bar of the frame 10 is a pivot pin 19 upon which is pivoted a lever 20. The rear end of the lever 20 is connected by means of a rod 21 with the forward end of the arm 18 so that oscillation of the lever 20 shall cause oscillation of axle 17.

The right hand flange of the forward fork of the bicycle or motor-cycle has clamped to it a lever 22 and connecting the extremity of this lever and the forward end of the lever 20 is a link or rod 23. The extremity of the arm 22 is formed as a fork carrying between its members a coil spring 24 pressing upon the rod 23 and 23ᵃ, and the rod is maintained in position by means of a locking device known as a check. The parts are so proportioned and so connected that oscillation of the front fork of the bicycle or motor-cycle and steering arm a corresponding oscillation of the axle wheel 17. In other words the forward wheel and side wheel oscillate on their vertical axes in unison and are kept in a state of substantial parallelism whether moving on a straight road or around corners, and the dragging effect heretofore incident to the operation of the side car in question use is avoided.

The side car body is suspended in any suitable manner upon springs, as seen at 25 and the broken lines in broken and shadowed lines. Pedestal and springs can be further supplemented by an elliptical spring 28 under the rear of the basket or car body.

It will be noted that with this construction the car body and side wheel are located relatively well forward of a middle line between the front and rear wheels of the bicycle or motor-cycle, so that occupant of the side car is substantially on a line with the driver of the machine and the driver can converse with the occupant of the car without turning his head. Moreover the fact that the side wheel is more forward than in usual constructions also renders the operation and control easier, especially in turning corners. My experience has been that when in such a structure the side wheel is mounted on a vertical axis in rear of a middle line between the front and rear wheels of the bicycle, the drag on the side wheel is so great that much care to go slowly must be taken in turning corners and to make the curve as long as practicable to avoid "capsizing." With the side wheel mounted forward of such middle line, as herein described, very short turns may be made at rapid speed with comparative safety.

What I claim is:

1. A side car for a bicycle or motor-cycle comprising, in combination, a car body supporting frame, a wheel to support the same, and means connecting said frame to the frame of the bicycle or motor-cycle permitting vertical movement thereof in a plane parallel to the plane of the wheels of the bicycle or motor-cycle.

2. A side car for a bicycle or motor-cycle comprising, in combination, a car body supporting frame, means for connecting the same to the frame of the bicycle or motor-cycle, a lateral extension from the forward portion of said frame, said extension lying forward of a middle line between the front and rear wheels of the bicycle or motor-cycle, a stud axle knuckled to said lateral extension, a side wheel on said stud axle and means for connecting said stud axle with the front fork of the bicycle or motor-cycle for steering said wheel in unison with the forward wheel of the bicycle or motor-cycle.

OSCAR METZE.

Witnesses:
W. J. ABERNATHY,
J. E. MEUSCHING.